Patented Mar. 11, 1941

2,234,317

UNITED STATES PATENT OFFICE 2,234,317

PROCESS FOR THE PRODUCTION OF A COATING COMPOSITION

Siegfried Pfeiffer, Riehen, near Basel, Switzerland, assignor to the firm J. R. Geigy A. G., Basel, Switzerland No Drawing. Application April 14, 1938, Serial No. 202,131
In Switzerland April 21, 1937

6 Claims. (Cl. 260—735)

This invention relates to a process for the production of a coating composition and is particularly concerned with coating mediums or varnishes having a chlorinated rubber basis. One of the objects of the invention is to provide a coating composition having improved properties compared with chlorinated rubber varnishes of usual composition.

According to this invention sulphuretted products of p-methyl substituted anilines are mixed with chlorinated rubber in the presence of a solvent. The sulphuretted products in question are mainly the reaction products of sulphur on p-toluidine and of sulphur on m-xylidine, i. e. dehydro-thio-p-toluidine and dehydrothio-m-xylidine, which can be used in the form of comminuted raw products, the so-called polychromine melt, or purified.

Coatings with such mixtures exhibit the advantage of considerably increased resistance to lyes and salt solutions, especially sea water. Their fastness to weather influences is also excellent.

By heating the mixtures, consisting of chlorinated rubber solutions and the sulphuretted products of p-toluidine or m-xylidine a substantial additional increase of the fastness to water and weather influences of the coatings obtainable can be produced, especially in the case of the transparent film.

Example 1

With 100 parts of chlorinated rubber solution, containing 25 parts of chlorinated rubber powder with a 60% content of chlorine, and 75 parts of chlorobenzene as solvent, are admixed 40 parts of polychromine melt (see Col. Index No. 812) in the homogenizer, and finally there are added 5 parts of a softening agent, as for example methyl adipic acid methylhexaline ester. A coating with this mixture produces a film with good adhesion to metals and which is particularly resistant to lyes, salts, benzene and the like.

Example 2

With 25 parts of chlorinated rubber powder with a chlorine content of about 66% there are admixed in the homogenizer 35 parts of finely ground dehydro-thio-m-xylidine, 7 parts of a pigment dyestuff of the constitution m-nitro-p-toluidine-azo-$\beta$-naphthol, 8 parts of a softening agent and with the addition of 75 parts of a solvent such as xylol-toluol in equal parts, the whole is mixed up into a solution ready for spreading. On applying this colour mixture a red film with the above mentioned properties is obtained.

Example 3

25 parts of chlorinated rubber powder with a chlorine content of 66% are dissolved in 75 parts of a solvent mixture 1:1 of chlorobenzen-xylol. After dissolving the powder there are added in suitable mixing apparatus 20 parts of finely ground polychromine melt, 20 parts of aluminum bronze, 5 parts of a softening agent such as tricresyl phosphate and 5 parts of linseed oil boiled in the presence of litharge and the whole is formed into a homogeneous colour mixture. On applying this mixture a film is obtained which presents especial advantages as under-water paint. Its resistance, especially to sea water, is excellent. No formation of blisters nor the slightest swelling is observed.

Example 4

25 parts of chlorinated rubber powder with a chlorine content of 60% are dissolved in 25 parts of a solvent mixture of chlorobenzene and tetralin. To the resulting highly viscous mass are added 20 parts of polychromine melt, 20 parts of thermax or gas soot and 8 parts of a softener and the whole is mixed in suitable mixing apparatus to a uniform paste. Then a further 50 parts of the above mentioned solvent mixture are added; before use the desired spreading capacity is adjusted by further cutting up.

Example 5

20 parts of the pulverised dehydro-thio-p-toluidine and 10 parts of thermax or gas soot or graphite, are ground as finely as possible by means of suitable mixing apparatus. Then 100 parts of a chlorinated rubber solution, containing 25 parts of chlorinated rubber powder with a chlorine content of 66%, and 75 parts of a solvent mixture consisting of chlorobenzene-toluol-sangajol, are added and the whole is mixed in the homogenizer. After spreading or spraying a grey film is formed of remarkable resistance to the above mentioned agents.

Example 6

100 parts of a chlorinated rubber solution in chlorobenzene of about 25% strength are maintained with 0.15 part of a polychromine melt for a number of hours at 80–90° C. There occurs an increase of the viscosity which is combined with a deepening of the colour shade. With these solutions transparent films are obtained, which in contrast to the usual transparent chlorinated rubber films have a considerably increased resistance to weather and water.

What I claim is:

1. In the manufacture of coating compositions on the basis of chlorinated rubber and organic solvents, the step of admixing the said substances with a compound selected from the group consisting of sulphuretted p-toluidine and sulphuretted m-xylidine.

2. A coating composition on the basis of chlorinated rubber dissolved in organic solvents of the character described containing as its essential ingredient a compound selected from the group consisting of dehydrothio-p-toluidine and dehydrothio-m-xylidine.

3. A coating composition of chlorinated rubber in organic solvents of the character described containing as its essential ingredient dehydrothio-p-toluidine and also a pigment and a softener.

4. A coating composition of chlorinated rubber in organic solvents of the character described, containing comminuted raw melt of dehydrothio-p-toluidine, the dyestuff m-nitro-p-toluidine-azo-$\beta$-naphthol and a softening agent.

5. A coating composition of chlorinated rubber in organic solvents of the character described, containing finely ground dehydrothio-p-toluidine, aluminium-bronze and a softener.

6. A coating composition of chlorinated rubber in organic solvents of the character described, containing the comminuted raw product obtained by melting sulphur and p-toluidine, gas soot and methyl adipic acid methylhexaline ester.

SIEGFRIED PFEIFFER.